United States Patent [19]

Cameron

[11] 4,213,005
[45] Jul. 15, 1980

[54] DIGITIZER TABLET

[76] Inventor: Eugene A. Cameron, Apt. L5, 11700 Old Columbia Pike, Silver Spring, Md. 20904

[21] Appl. No.: 968,841

[22] Filed: Dec. 13, 1978

[51] Int. Cl.² ............................................. G08C 21/00
[52] U.S. Cl. ....................................... 178/18; 178/19
[58] Field of Search ..................... 178/18, 19, 20, 87; 340/146.3 SY, 567, 347 AD; 346/139 C; 318/568

[56] References Cited

U.S. PATENT DOCUMENTS

| | | | |
|---|---|---|---|
| 2,814,032 | 11/1957 | Agnew et al. | 340/567 |
| 3,342,935 | 9/1967 | Leifer et al. | 178/18 |
| 3,647,963 | 3/1972 | Bailey | 178/19 |
| 3,700,809 | 10/1972 | Nadon | 178/87 |
| 3,725,760 | 4/1973 | Bailey | 178/18 X |
| 3,735,044 | 5/1973 | Centner et al. | 178/19 |
| 3,801,733 | 4/1974 | Bailey | 178/19 |
| 3,846,580 | 11/1974 | Brenner | 178/19 |
| 3,873,770 | 3/1975 | Ioannou | 178/18 |
| 3,904,822 | 9/1975 | Kamm et al. | 178/19 |
| 3,975,592 | 8/1976 | Carvey | 178/18 |
| 3,983,322 | 9/1976 | Rodgers | 178/19 |
| 4,018,989 | 4/1977 | Snyder et al. | 178/18 |
| 4,022,971 | 5/1977 | Rodgers | 178/19 |
| 4,054,746 | 10/1977 | Kamm | 178/19 |
| 4,080,515 | 3/1978 | Anderson | 178/19 |

Primary Examiner—Thomas A. Robinson
Attorney, Agent, or Firm—Kerkam, Stowell, Kondracki & Clarke

[57] ABSTRACT

A system for precisely determining the location of a cursor on a work surface with respect to a grid of coordinate conductors. The system is based on the time-distance relationship of current sheets caused to move sequentially along each axis of the work surface, and the detection of each current sheet as it approaches and passes an operator-movable sensor. A number of the grid wires are simultaneously energized with a fixed energization pattern which steps along the conductors, thereby generating the current sheet and consequent magnetic field which translate along the plane of the conductors parallel to the conductors. A preferred means responsive to the time of passage of the current sheet comprises an inductive pickup coil having a diameter approximately equal to the width of the current sheet and means for sensing current induced in the pickup coil. Preferably, the grid conductors are energized with substantially fixed constant currents. Among the important advantages of the invention are enhanced signal levels with improved signal to noise ratios, improved immunity to extraneous noise, relative insensitivity to minor inaccuracies in the placement of the grid wires in the manufacture of the tablet, excellent resolution, and a high degree of stability. Moreover, the system, through several discoveries, is characterized by a relative lack of undue complexity, while serving well its intended function.

32 Claims, 13 Drawing Figures

DIGITIZER TABLET

BACKGROUND OF THE INVENTION

The present invention relates to a system for precisely determining the location of a cursor on a work surface with respect to a grid of coordinate conductors.

Systems for recording points and curves on a work sheet by monitoring the position of a cursor or similar movable device on a work surface are well known in the art. Such systems are known by various names, such as "coordinate digitizer" or "digital transducer". In general, these systems comprise a work table, known as a tablet, having a conductor grid lying under the surface thereof. From signals coupled between the conductor grid and the cursor, data representing the Cartesian coordinates of the cursor on the work surface are generated. Thus an operator may place a drawing or the like on the work surface an generate and store data representing points or lines on the drawing simply by tracing out the points or lines with the cursor.

In one particular type of system, the tablet has for each axis a plurality of spaced, parallel conductors essentially co-extensive with the work surface. Circuitry produces successive sequential pulse excitation of the conductors, resulting in an effectively moving pulse wave. A cursor, stylus, or other sensor responds to the passage of the pulse wave through the position of the cursor. For example, the cursor may carry an inductive pickup coil, and a voltage is induced therein as the pulse wave passes. The position of the cursor along the coordinate axis may be determined from the precise time of passage of the pulse wave through the cursor position. In a typical arrangement, a high resolution timer comprising a digital counter determines the time between the beginning of the conductor excitation sequence and the response by the cursor. This time then represents the cursor distance along the coordinate axis.

It will be appreciated that, insofar as the general concepts of this type of system and of the present invention are concerned, the precise nature of the mechanical arrangement which carries the pickup coil is of little significance, and the term "cursor" as employed herein is intended to include all similar devices which serve to indicate to the operator the particular point on the work surface which is being recorded. This is not intended to imply that there are not differences in the various possible cursor-like mechanical arrangements; only that these differences are not significant with respect to the scope of the present invention.

Examples of this general type of system wherein tablet conductors are sequentially energized are disclosed in the following U.S. Pat. No. 3,342,935—Leifer et al; No. 3,904,822—Kamm et al; No. 3,975,592—Carvey; No. 4,054,746—Kamm; and No. 4,080,515—Anderson.

In another general type of system, a plurality of tablet conductors are energized at the same time with signals which are out of phase. By responding to phase information, and possibly frequency information, the movable cursor sensor and associated circuitry can provide data indicating cursor position. Examples of this general type of system are disclosed in the following U.S. Pat. No. 3,342,935—Leifer et al (also cited above); No. 3,647,963—Bailey; No. 3,983,322—Rodgers; and No. 4,022,971—Rodgers.

While these various prior art devices generally serve their desired function, and at least one has been commercially produced, they do as a class have a number of disadvantages such as undue complexity, being difficult and expensive to manufacture, being difficult or tedious to calibrate, having limited accuracy attainable as a practical matter, and being difficult to repair. Prior to the present invention there therefore remained a need for an improved digital transducer, which need is met by the present invention.

SUMMARY OF THE INVENTION

Accordingly, it is an object of the invention to provide a digital transducer system which has, compared to prior art devices, much improved resolution and accuracy in its practical embodiments.

It is another object of the invention to provide such a system with improved immunity to extraneous noise, and a resultant avoidance of inaccuracies resulting from response to noise.

It is still another object of the invention to provide such a system which is relatively insensitive to minor inaccuracies in the placement of the grid wires in the manufacture of the tablet.

It is still another object of the invention to provide such a system which, once calibrated, has a high degree of stability as environmental conditions, such as temperature and humidity, change.

In connection with the foregoing object, it is another object of the invention to provide such a system which includes circuitry which avoids the requirement for electrical components of high stability and critical values.

It is still another object of the invention to accomplish all of the foregoing objects in a system which is greatly simplified as compared with previous systems of this type, with consequent lower cost and greater reliability.

The present system is based on the time-distance relationship of current sheets caused to move sequentially along each axis of the work surface, and the detection of each current sheet as it approaches and passes an operator-movable sensor on the work surface. Thus the present system is of the first general type mentioned above. Although the system is described herein in terms of orthogonal crossed conductors, it is to be understood that any other system of coordinates may be used, such as polar, multipolar, or other coordinate systems. In the simplest case, the system may be for locating the position of a cursor in terms of distance along a single coordinate axis.

Briefly stated, and in accordance with one aspect of the invention, a system for locating the position of a cursor along a coordinate axis includes a plurality of parallel conductors spaced along the axis and defining a locus, which locus preferably is a plane. The system further includes means for sequentially energizing the conductors in simultaneously energized lesser pluralities with a fixed energization pattern which steps along the plurality of conductors, and thereby generates a current sheet which translates along the locus of the conductors and parallel to the conductors. As a consequence of the moving current sheet there is a moving magnetic field. Preferably, the fixed energization pattern comprises all of the lesser plurality of conductors being energized. The system further includes means for sensing the passage of a particular portion of the current sheet across a reference point carried by the cursor. A means is responsive to the time of passage of the particular portion of the current sheet for generating an output signal representing the position of the cursor along the coordinate axis.

An important feature of the system described briefly above is the simultaneous energization of a lesser plurality of the conductors with a fixed energization pattern which steps along the plurality of conductors. This is in contrast to previous systems of the moving pulse type wherein only one conductor at a time is energized. This energization of multiple wires has a number of important advantages, three of which are as follows: (1) The sensor carried by the cursor responds to the current in a number of conductors at the same time, producing an averaging effect which lessens the criticality of the placement of any individual wire. (2) More accurate interpolation of positions between conductors results. (3) Because a number of conductors are energized at the same time, a stronger signal is sensed by the sensor, improving the system signal to noise ratio.

In the preferred embodiment, the cursor carries an inductive pick-up coil comprising the sensor. Briefly stated, and in accordance with another important aspect of the invention, current induced in the inductive pickup coil is sensed to determine the passage of a particular portion of the current sheet. This is in contrast to typical prior art systems wherein voltage induced in the coil is sensed. Current sensing, which may for example be accomplished by connecting the coil to the input terminals of a relatively low input impedance current-to-voltage converter, results in a much greater power transfer than does voltage sensing, again enhancing the signal to noise ratio of the system.

Another advantage which follows from the relatively high signal levels available in the system, and more particularly, the signal levels picked up by the pickup coil, is that unduly narrow bandpass filtering need not be resorted to for the purposes of enhancing otherwise unsatisfactory signal to noise ratio. The relatively wide bandpass filters employed in the present system accordingly use less critical components, introduce less delay, and are more stable, particularly in terms of phase delay, as component values vary due to temperature changes and other factors.

In accordance with another aspect of the invention, the diameter of the inductive pickup coil is approximately equal to the width of the current sheet along its direction of translation. As is described in more detail hereinafter, this results in a generation of a current waveform which permits precise determination of the time of passage of a particular portion of the current sheet. In one particular embodiment, the fixed energization pattern of conductors comprises seven conductors at a time being energized. The inductive pickup coil thus spans seven of the spaced tablet conductors across its diameter.

Briefly stated, and in accordance with still another aspect of the invention, the conductors are energized with substantially fixed constant currents. As a result, adverse effects of minor variations in the cross-sectional area and thus resistivity of the conductors employed, as well as of variations in the current switching elements for the individual conductors, are minimized.

In accordance with still another aspect of the invention, pickup coil current, after being converted to a voltage, is passed through a low pass frequency filter which generates a waveform envelope representative of the current induced in the pickup coil. With the high frequency components removed, the waveform envelope is smooothly linearized about zero, and distance may be precisely interpolated between steps caused by wire spacing. In a practical version of the invention, a resolution and stability of 0.01 millimeters is readily attained.

For enhanced accuracy of the sensing of the passage of a particular portion of the current sheet past the cursor, and for enhanced noise immunity, the system includes first and second comparators responsive to the waveform envelope crossing respective thresholds. The first comparator responds to the waveform envelope crossing one threshold. A means responsive to this first comparator enables the second comparator, and the second comparator responds to the waveform envelope crossing another threshold to generate a timing signal. The second comparator is enabled for a predetermined interval selected to allow response to the waveform crossing the other threshold when the portion of the current sheet actually crosses the reference point, and selected to minimize the possiblity of response to the waveform crossing the other threshold due to an extraneous noise signal. In addition to enhanced noise immunity provided by the selective enabling of the second comparator, this selective enabling permits a threshold point to be selected which is optimally sensitive to amplitude variations in the sensed signal. This aspect then provides another contribution enhancing the accuracy of the present coordinate conversion system.

In accordance with the invention, the means for sequentially energizing the conductors in simultaneously energized lesser pluralities preferably comprises a serial-in/parallel-out shift register having outputs connected to energize corresponding ones of the tablet conductors. There is a means for clocking the serial-in/parallel-out shift register, and means synchronized with the clocking means for serially entering data into the serial-in/parallel-out shift register in accordance with the fixed energization pattern. The means for serially entering data into the serial-in/parallel-out shift register may comprise a parallel-in/serial-out shift register having its parallel data inputs connected to fixed logic levels in accordance with the fixed energization pattern, and having its serial input connected to a fixed logic level appropriate to establish the trailing edge of the current sheet.

In accordance with still another aspect of the invention, there is provided a system for locating the position of a cursor on a surface in terms of two dimensions. The system includes a conductor grid including a first plurality of parallel conductors spaced along a first axis in a plane parallel to the surface, and including a second plurality of parallel conductors spaced along a second axis perpendicular to the first axis also in a plane parallel to the surface. The conductors of the second plurality are accordingly perpendicular to the conductors of the first plurality. The system additonally includes means for sequentially energizing the conductors in simultaneously energized lesser pluralities with a fixed energization pattern which steps first along the first plurality of conductors and then along the second plurality of conductors, thereby generating a first current sheet which translates along the plane of and parallel to the conductors of the first plurality, followed by a second current sheet which translates along the plane of and parallel to the conductors of the second plurality. There is provided a means for sensing the passage of a particular portion of each of the current sheets across a reference point carried by the cursor, and a means is responsive to these times of passage for generating an output signal representing the coordinate position of the cursor on the surface.

Briefly stated, and in accordance with still another aspect of the invention, there is provided a sensing arrangement for use in a system for locating the position of the cursor along a coordinate axis, which system is of the type which sequentially energizes a plurality of parallel conductors spaced along the axis to produce a current wave which translates along the axis and which system responds to the time of passage of the current wave past the cursor to generate an output signal representing the position of the cursor along the coordinate axis. The sensing arrangement comprises an inductive pickup coil carried by the cursor and means for sensing current induced in the inductive pickup coil. Preferably, the current sensing means comprises a current-to-voltage converter. Thus, it will be appreciated that the current sensing aspect of the invention, while especially useful in the context of the disclosed system wherein a lesser plurality of the spaced conductors are simultaneously energized with a fixed energization pattern, may additionally be used in those systems wherein only one conductor at a time is energized, with an enhancement in the signal to noise ratio of those systems as well.

In accordance with another aspect of the invention, the mechanical construction of the tablet, and more particularly of the spaced conductors, provides enhanced dimensional stability. The conductors comprise insulated wires bonded to a surface. The surface may be glass where a backlighted tablet is desired, or may be a ferromagnetic material, such as steel, where backlighting is not required. The use of such substrates for the conductors minimizes dimensional instability.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
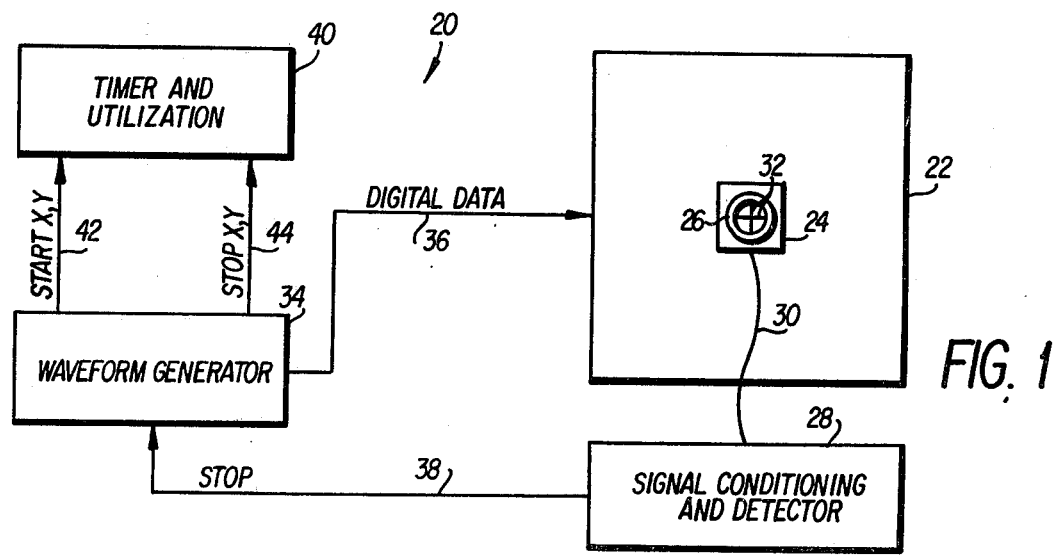
FIG. 1 is a highly schematic block diagram of a digital transducer according to the present invention.

Referring first to FIG. 1, a digital transducer system, generally designated 20, includes a tablet 22 upon which a worksheet (not shown) may be placed. A cursor 24 is movable about the surface of the tablet 22 and carries an inductive pickup coil 26 connected to a signal conditioning and detector circuit 28 through a two-conductor cable 30. The cursor 24 additionally has a pair of crosshairs 32 for accurately positioning the cursor 24 with respect to a point on the tablet 22. Preferably, the crosshairs 32 are carried by a transparent sheet on the underside of the cursor 24, with the intersection of the crosshairs 32 located in the precise center of the pickup coil 26. Although not shown in FIG. 1, the tablet 22 has the usual grid of conductors beneath its surface, and additionally comprises shift register and conductor driver circuitry described below with particular reference to FIG. 3. As was briefly described above in the "Summary of the Invention" and described in greater detail hereinafter, the tablet conductors are suitably energized to produce alternate X and Y moving current sheets and resultant moving magnetic fields.

Still referring to FIG. 1, the system 20 additionally includes waveform generator circuitry 34 which supplies digital data via a line 36 to operate the circuitry of the tablet 22. The waveform generator circuitry 34 is adapted to receive a STOP signal via a line 38 from the signal conditioning and detector circuitry 28 in response to the moving magnetic field produced by the moving current sheet approaching and passing the cursor 24, and more particularly the pickup coil 26 carried thereby, at particular times depending upon the precise location of the cursor 24 on the surface of the tablet 22.

In order to provide an indication of the Cartesian coordinates of the cursor 24 on the surface of the tablet 22, and to use this information, the system of 20 includes timer and utilization circuitry 40 which receives START X, Y and STOP X, Y signals from the waveform generator 34 via signal paths represented in FIG. 1 by lines 42 and 44.

In the operation of system 20, digital data produced by the waveform generator 34 causes circuitry within the tablet 22 to produce sequential current sheets with accompanying magnetic fields which translate along the X and Y axes of the tablet 22. The times when these respective current sheets pass the cursor 24 are sensed by the pickup coil 26 and associated signal conditioning and detector circuitry 28. From the precise times of passage of the current sheets, an output signal representing the position of the cursor 24 is generated. In the particular arrangement depicted in FIG. 1 and described in detail below, a timer comprising a digital counter within the timer and utilization circuitry 40 is started in response to a signal on the START X, Y line 42 when the respective current sheets begin their translation across the tablet 22, and is stopped in response to a signal on the STOP X, Y line 44 generated when the signal conditioning and detector circuitry 28 is activated.

Figure 2:
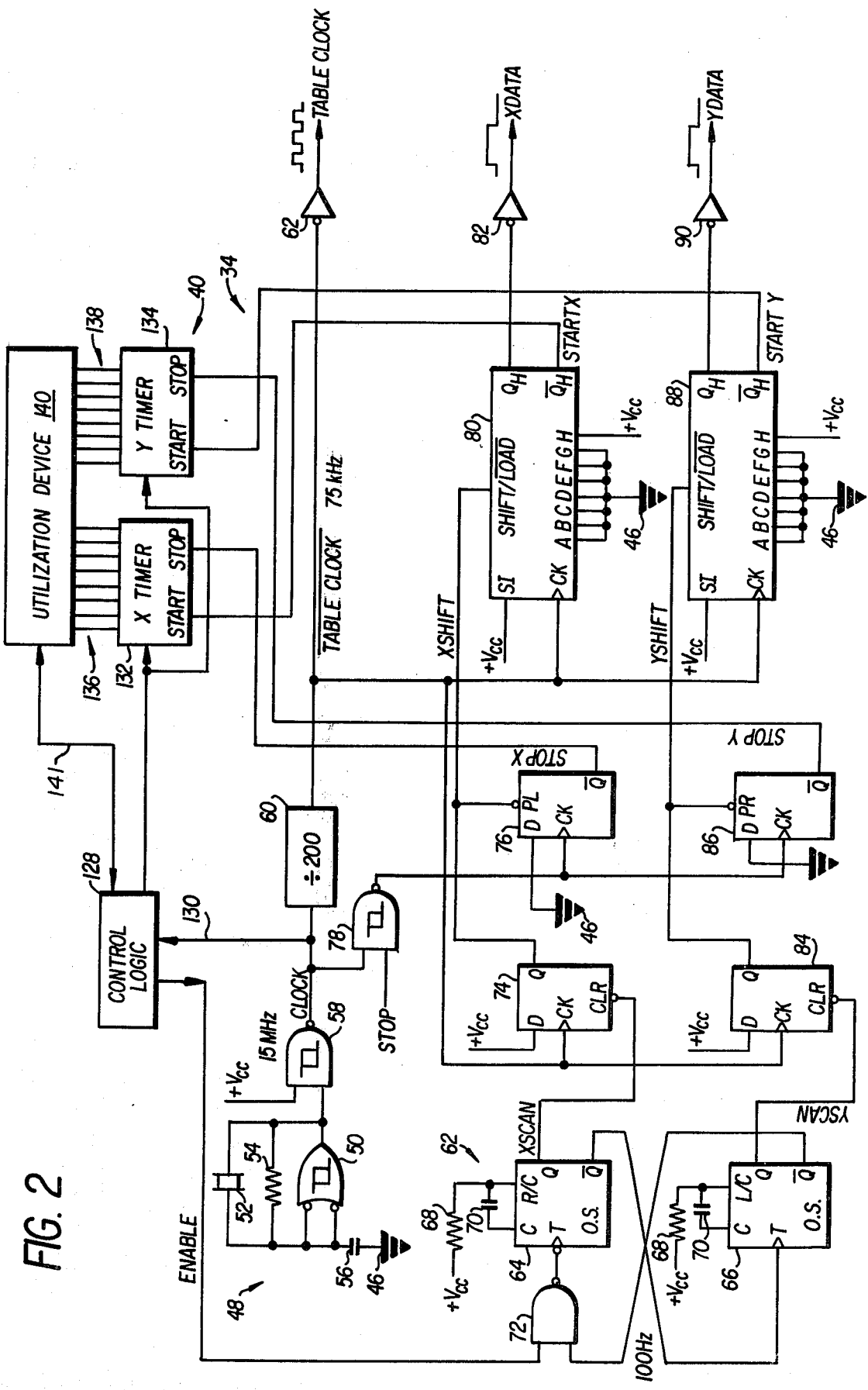
FIG. 2 is an electrical schematic diagram of a digital logic circuit suitable for use as the "Waveform Generator" block of FIG. 1.

Referring now to FIG. 2, a detailed schematic diagram of the FIG. 1 waveform generator 34 is shown, along with a more general diagram of the FIG. 1 timer and utilization circuitry 40. It will be appreciated that the circuitry of FIG. 2, as well as of the other FIGS., includes several conventional power supplies which are merely represented herein by terminals designated $+V_{CC}$, $+12V$, and $-12V$, all referenced to a common circuit reference point or circuit ground 46. Typically, $+V_{CC}$ is five volts. It will be appreciated that the various digital logic devices described herein require supply voltage connections to $+V_{CC}$ as well as to circuit ground 46. However, for clarity of illustration there are, for the most part, omitted.

Considering FIG. 2 in detail, the system includes a master clock pulse generator 48 comprising a 15 MHz crystal overtone oscillator including as its active element a low activated Schmitt trigger OR gate 50 having its inputs tied together so as to function as an inverting amplifier. An overtone quartz crystal 52 and a resistor 54 are connected in parallel between the output and the input of the low activated OR gate 50, and a capacitor 56 connects the gate 50 input to circuit ground 46. The clock pulse generator 48 additionally comprises a Schmitt trigger NAND gate 58 connected as an output buffer amplifier following the crystal oscillator and driving a CLOCK line.

Various elements of the system require a much lower clock frequency. Accordingly, a conventional divide-by-two-hundred counter 60 has its input connected to the CLOCK line and drives a $\overline{\text{TABLE CLOCK}}$ line at a frequency of 75 kHz. Additionally, an inverter 62 supplied by the $\overline{\text{TABLE CLOCK}}$ line drives a TABLE CLOCK line. It will be appreciated that the particular clock frequencies identified herein are by way of example only, and that modifications are possible.

The system described herein provides a digital data output in English units of measure, i.e. in inches and fractions of inches. However, where it is desired to provide an output in metric units, it is a simple matter to alter the frequency of the clock pulse generator 48, the division ratio of the divider 60, or both, by an appropriate amount. In this way, data output in metric units may be realized without the expense and complexity, as well as rounding errors, of mathematical conversion at the output point.

As previously noted, scans of the X axis and of the Y axis of the tablet 22 to produce the moving current sheets are not accomplished at the same time, but rather are accomplished either sequentially (in the case of a single operation to determine the position of the cursor 24) or alternately (when the system is operating continuously). To control the scanning of the X and Y axes, an astable multivibrator 62 comprises a pair of cross-coupled monostable multivibrators configured as one shots (O.S.) 64 and 66, each of which has a period of 5 milliseconds (ms), with a resultant oscillation frequency of 100 Hz. Each of the one shots 64 and 66 is a commercially available integrated circuit device and includes an external resistor 68 and a capacitor 70 connected to the appropriate C and R/C terminals.

In the cross-coupled configuration it will be seen that the Q output of the upper one shot 64 is connected to a high activated trigger (T) input of the lower one shot 66 while the $\overline{Q}$ output of the lower one shot 66 is connected through a NAND gate 72 to a low activated trigger (T) input of the upper one shot 64. The upper input of the NAND gate 72 receives an ENABLE line which must be high for the astable multivibrator 62 to begin each oscillation cycle with the activation of the upper one shot 64. When ENABLE is high, the astable multivibrator 62 freely oscillates, driving XSCAN and YSCAN lines connected to the respective Q outputs of the one shots 64 and 66. It will be appreciated that XSCAN and YSCAN are 180 degrees out of phase, i.e., when one is high, the other is low, and vice versa. When XSCAN goes high, it initiates a scan along the X axis of the tablet 22, and when YSCAN goes high, in initiates a scan along the Y axis of the tablet 22.

Considering now those circuit elements which generate the waveforms for a scan of the X axis, the XSCAN line is connected to the low activated clear (CLR) input of a D-type flip-flop 74. The D input of the flip-flop 74 is tied directly to logic high ($+V_{CC}$), and the clock (CK) input is connnected to the TABLE CLOCK line. The Q output of the flip-flop 74 drives an XSHIFT line.

The XSHIFT line is connected to the low activated preset (PR) input of another D-type flip-flop 76. The D input of the flip-flop 76 is connected to logic low (circuit ground 46) and the clock (CK) input is connected to the output of a Schmitt trigger NAND gate 78 which, in turn, has its upper input connected to the CLOCK line, and its lower input connected to a STOP line. The $\overline{Q}$ output of the flip-flop 76 supplies a STOP X line which generally corresponds to one-half of the representative STOP X, Y line 44 of FIG. 1.

The XSHIFT line is also connected to the SHIFT/$\overline{\text{LOAD}}$ control input of a parallel-in/serial-out shift register 80. The function of the shift register 80 is to generate the fixed energization pattern of the tablet 22 conductors by generating an appropriately timed serial digital data word.

More particularly, the shift register 80 is an eight-stage shift register having eight parallel inputs designated A through H. The first seven of these inputs, A through G, are tied to logic low (circuit ground 46), while the right-most data input H (first to shift out) is connected to logic high ($+V_{CC}$). The serial input (SI) of the shift register 80 is also tied directly to logic high ($+V_{CC}$) and the clock (CK) input is connected to the TABLE CLOCK line.

The $Q_H$ output of the shift register 80 supplies an XDATA line through an inverter 82. The $Q_H$ output of the shift register 80 supplies a START X line which generally corresponds to one-half of the representative START X, Y line 42 of FIG. 1.

The circuit elements for a scan of the Y axis are substantially identical and will not be further described except to note that a D-type flip-flop 84 corresponds to the D-type flip-flop 74, another D-type flip-flop 86 corresponds to the D-type flip-flop 76, and another parallel-in/serial-out shift register 88 corresponds to the shift register 80. The Q output of the flip-flop 84 supplies a YSHIFT line, the $\overline{Q}$ output of the flip-flop 86 supplies a STOP Y line, the $Q_H$ output of the shift register 86 supplies a YDATA line through an inverter 90 and the $\overline{Q}_H$ output of the shift register 88 supplies a START Y line.

Figure 3:
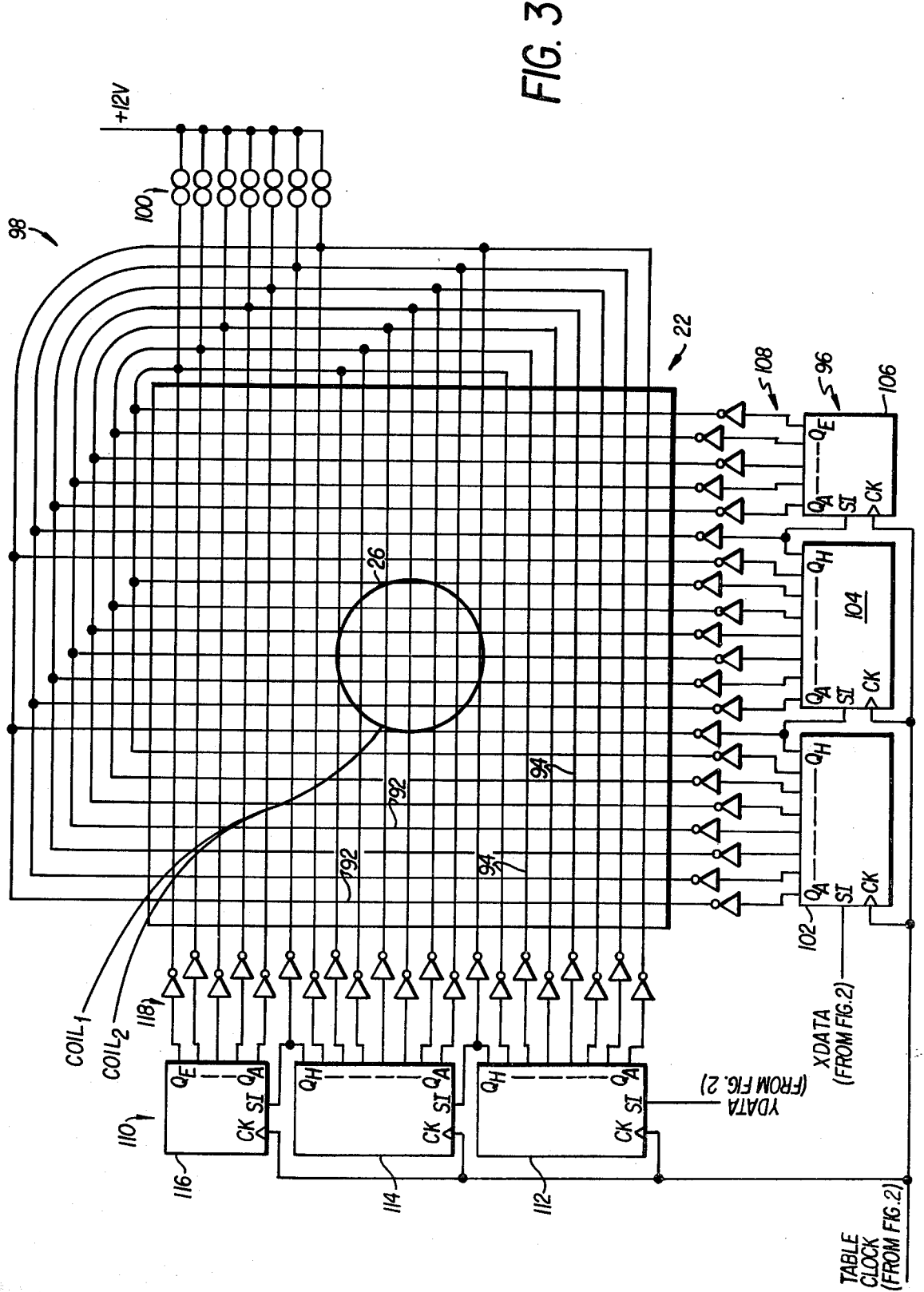
FIG. 3 is a highly schematic representation of the tablet of FIG. 1 showing a representative small sample of the grid wires therewithin, along with shift register and constant current generator circuitry for energizing the tablet grid conductors.

Leaving FIG. 2 temporarily and referring to FIG. 3, the remaining portion of the X and Y scanning circuitry is shown along with a more detailed, but yet highly schematic, representation of the tablet 22. The scanning circuitry of FIG. 3 receives the XDATA, the YDATA and the TABLE CLOCK lines from the FIG. 2 circuitry.

More particularly, the tablet 22 of FIG. 3 comprises a first plurality 92 of parallel conductors uniformly spaced along the X axis and defining a locus, in this case a plane, lying just under the upper surface of the tablet 22. Similarly, a second plurality 94 of parallel conductors is uniformly spaced along the Y axis, which is perpendicular to the X axis such that the conductors of the second plurality 94 are perpendicular to the conductors of the first plurality 92. The conductors of the second plurality 94 also lie in a plane parallel to the surface of the tablet 22. The conductors of the first and second pluralities 92 and 94 accordingly comprise a conductor grid of a type generally known in the art.

In the particular embodiment described herein the tablet conductors comprising the first and second pluralities 92 and 94 are spaced on 0.2 inch centers, which makes manufacture quite feasible and provides excellent resolution. The overall extent of the active portion of the tablet 22 does not have any particular limit, and the tablet 22 may have any reasonable dimensions. One example of a size currently being manufactured is forty-two inches by sixty inches for the active area of the tablet. With 0.2 inch conductor spacing (five per inch), this requires three-hundred tablet conductors of the first plurality 92 for X axis scans, and two-hundred ten tablet conductors of the second plurality 94 for Y axis scans. It will accordingly be appreciated that the arrangement of FIG. 3 comprising only twenty-one by twenty-one tablet conductors is merely a representation, on a relatively small scale, serving only to illustrate the principles of the invention. While the actual physical embodiment of the conductor grid may be any of the types previously employed, a particular preferred embodiment will be described hereinafter with particular reference to FIG. 12.

For energizing the first plurality 92 of conductors along the X axis, an extended serial-in/parallel-out shift register 96 is generally disposed along the lower edge of the tablet 22 in the particular orientation illustrated. Disposed along the upper edge of the tablet 22 in the illustrated orientation is a supply buss comprising a plurality of conductors 98 supplied by a plurality of constant current sources 100. The conductors of the first plurality 92 extend generally between the constant current conductors 98 and the stages of the extended shift register 96.

More particularly, the extended shift register 96 comprises a plurality of individual serially connected intregrated circuit shift registers 102, 104 and 106. It will be appreciated that the arrangement illustrated in FIG. 3 is greatly abbreviated, as in an actual manufactured system many more individual eight-stage serial-in/parallel-out shift registers are connected in series. For example, with three-hundred X axis tablet conductors, thirty-eight individual shift register integrated circuit packages are required. Accordingly, the illustrated shift registers 102, 104 and 106 will be understood to be exemplary only.

The clock (CK) inputs of each of these shift registers 102, 104 and 106 are connected to the TABLE CLOCK line from the FIG. 2 waveform generator 34. The serial input (SI) of the first shift register 102 receives the XDATA line from FIG. 2, and the serial input (SI) of each succeeding shift register is connected in usual fashion back to the $Q_H$ output of the preceding shift register.

The individual parallel outputs of the extended shift registers 96 are connected to the conductors of the first plurality 92 through individual inverting buffer amnplifiers 108. The inverting buffer amplifiers 108 are also referred to herein as current switching elements. The buffer amplifiers 108, when activated by logic highs from the respective parallel outputs ($Q_A$ through $Q_H$) of the individual shift register stages, complete connections of the lower ends of the conductors to circuit ground 46 through circuitry internal to the buffers 108.

Considering now the upper ends of the conductors of the first plurality 92, it will be seen that there are seven of the upper constant current conductors 98 and seven of the constant current sources 100. Since no more than seven of the tablet conductors are energized at one time in the particular embodiment described herein, only seven current sources 100 are required. The particular connection illustrated allows each of the tablet conductors to be energized with a substantially fixed constant current. More particularly, it will be seen that the upper ends of the tablet conductors of the first plurality 92 are connected to the constant current conductors 98 in a sequence which repeats every seven conductors.

The portion of the Y scanning circuitry associated with the tablet 22 and illustrated in FIG. 3 is substantially identical to that associated with the X scanning circuitry and will not be further described except to note that an elongated serial-in/parallel-out shift register 110 corresponds to the elongated shift register 96, individual eight-stage register sections 112, 114, and 116 correspond to the integrated circuit shift registers 102, 104 and 106, respectively, and inverting buffer amplifiers 118 or current switching elements correspond to the buffer amplifiers 108.

The clock (CK) inputs of the shift registers 112, 114 and 116 are also connected to the TABLE CLOCK line, and the serial-input (SI) of the first Y axis shift register 112 is connected to the YDATA line from FIG. 2.

In the orientation illustrated in FIG. 3, the right side ends of the second plurality 94 of conductors are connected to the same set of constant current lines 98 and in the same repeating pattern as was described with reference to the conductors of the first plurality 92. Since the X and the Y axes are scanned either sequentially or alternately and not at the same time, a single set of seven constant current sources 100 is sufficient for the entire tablet 22.

Figure 4:
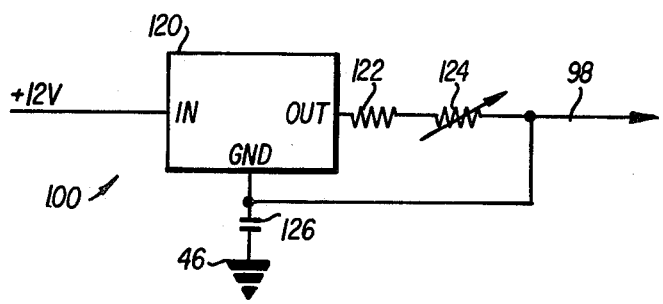
FIG. 4 is an electrical schematic diagram of a representative one of the seven constant current generators of FIG. 3.

Referring briefly to FIG. 4, there is shown a schematic diagram of one of the eight constant current sources 100 of FIG. 3. The constant current source 100 of FIG. 4 comprises a commercially available five volt integrated circuit voltage regulator 120 having its input (IN) connected to a +12 volt source and its output (OUT) connected through a pair of resistors 122 and 124 to one of the constant current lines 98. To sense the voltage drop across the resistors 122 and 124, the ground (GND) terminal of the voltage regulator 120 is connected to the line 98. A bypass capacitor 126 is connected between the GND terminal and circuit ground 46.

In the operation of the representative constant current source 100, the voltage regulator integrated circuit 120 attempts to maintain a constant five volt drop across the resistors 122 and 124 by supplying whatever current is required. Since a relatively insignificant current flows from the GND terminal (serving as a high impedance reference input only), the current flowing in the conductor 98 is substantially unaffected thereby. From Ohm's law, current in the conductor 98 is substantially equal to the five volts maintained by the regulator 120 divided by the combined resistance of the resistors 122 and 124. Of course, this holds true only when the constant current conductor 98 is connected to an energized one of the tablet conductors and current is actually flowing. In the particular embodiments illustrated herein, the constant current is selected to be thirty milliamperes for a tablet having a steel substrate which tends to concentrate the magnetic field, and ninety milliamperes for a tablet having a glass substrate.

With all the circuitry for driving the conductors of the tablet 22 for producing the fixed energization pattern which steps along the tablet conductors to generate a current sheet now having been described, FIG. 2 is again referred to for a brief description of the timer and utilization portion 40 of the system. The timer and utilization circuitry 40 is described only briefly herein as various arrangements are known in the art, and the particular timer and utilization circuitry is not part of the present invention.

In FIG. 2, the timer and utilization circuitry 40 includes control logic 128 which supplies the ENABLE line which may be used for external control of the scanning of the tablet 22. Conveniently, a common clock pulse source is employed. Hence, the CLOCK line is connected via a conductor 130 to the control logic 128.

It will be appreciated that the determination of the position of the cursor 24 is based upon sensing of the passage of a particular portion of the current sheet, and more particularly of the moving magnetic field generated thereby, as it translates across the tablet 22. Accordingly, timers 132 and 134 (X TIMER and Y TIMER) are employed which may comprise digital counters driven from the clock pulse generator 48 through an internal connection in the control logic 128. While separate timers 132 and 134 are illustrated for the X and Y axes, a single timer may be employed if desired since the X and Y scans take place at different times. The economy thereby afforded makes this alternative even preferable. However, for clarity of illustration, two separate timers are illustrated.

Each of the timers 132 and 134 includes a "Start" input and a "Stop" input. Considering the X TIMER 132, the START X line from the shift register 80 goes high at the beginning of the sweep of the X axis current waveform across the tablet 22, and the STOP X line from the flip-flop 76 goes high upon the passage of a particular portion of the current sheet past the cursor 24, and more particularly past the pickup coil 26 carried thereby. The final count in the X TIMER 134 thus indicates the time interval and the equivalent distance of the cursor 24 along the X axis.

The Y TIMER 134 receives corresponding inputs, the START Y line being an output of the shift register 88 and the STOP Y line being an output of the flip-flop 86.

Parallel outputs 136 and 138 of the timers 132 and 138 are connected to a utilization device 140. The utilization device 140 may take any one of a number of forms. Examples are a numerical readout, a recording medium such as magnetic tape or punched cards, or a computer-based data processing system. Entry of data into the utilization device 40 may be supervised by the control logic via a bi-directional channel 141.

While in the particular system described herein, to determine the coordinates the time of passage of the particular portion of the current sheet past the cursor 24 is compared with the time that the current sheet begins its translation across the tablet 22, it will be appreciated that this particular comparison is entirely arbitrary and is chosen for convenience. It will further be appreciated that the time of passage may be compared to any other reference such as the end of the sweep, or any intermediate portion of the sweep. In a broad sense then, it is the output signal generated by the cursor 24 circuitry which represents the position of the cursor 24 along a particular coordinate axis.

Before considering the details of the signal conditioning and detector circuitry 28, the pickup coil 26 carried by the cursor 24 and connected to the signal conditioning and detector circuitry 28 will be described. While not critical, in a preferred embodiment the pickup coil 26 comprises in the order of five-hundred turns of thirty gauge valve. In an important aspect of the invention, the diameter of the pickup coil 26 is approximately equal to the width of the moving current sheets generated across the tablet 22. Accordingly, as may best be seen from FIG. 3, in the illustrated embodiment where seven tablet conductors at a time are energized, the pickup coil 26 diameter spans seven tablet conductors. With a tablet conductor spacing of 0.2 inch, the diameter of the pickup coil 26 is 1.4 inches. As will be more apparent from the description of the operation below, this selection of pickup coil diameter provides a fairly strong signal having a waveform which is easily processed.

While in the preferred embodiment the means for sensing the passage of the current sheet across the cursor 24 comprises the inductive pickup coil 26, it will be appreciated that other types of sensors may be employed. One example is a Hall effect magnetic sensor.

Figure 5:
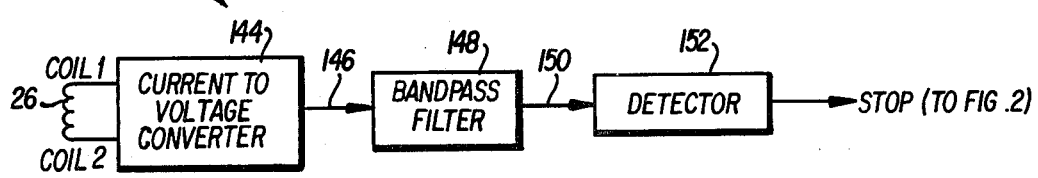
FIG. 5 is a block diagram of one suitable form of the "Signal Conditioning and Detector" block of FIG. 1.

Referring now to FIG. 5, a block diagram of particular means 142 including the pickup coil 26 for sensing the passage of a particular portion of the current sheet is illustrated in block diagram form. This means 142 comprises a current-to-voltage converter 144 connected to the COIL$_1$ and COIL$_2$ outputs of the pickup coil 26. The voltage output line 146 of the current-to-voltage converter 144 is connected to a bandpass filter 148, which more particularly comprises a highpass filter to discriminate against a 60 Hz hum pickup and a lowpass filter. By filtering out high frequency transitions at the 75 kHz TABLE CLOCK frequency, the bandpass filter 148 generates a waveform envelope representative of current induced in the inductive pickup coil 26.

The bandpass filter 148 is connected via a line 150 to a suitable detector 152 which generates the STOP signal in response to a particular portion of the representative current waveform envelope. The STOP line is connected back to the lower input of the Schmitt trigger NAND gate 78 of FIG. 3, and, when high, enables the NAND gate 78.

Figure 6:
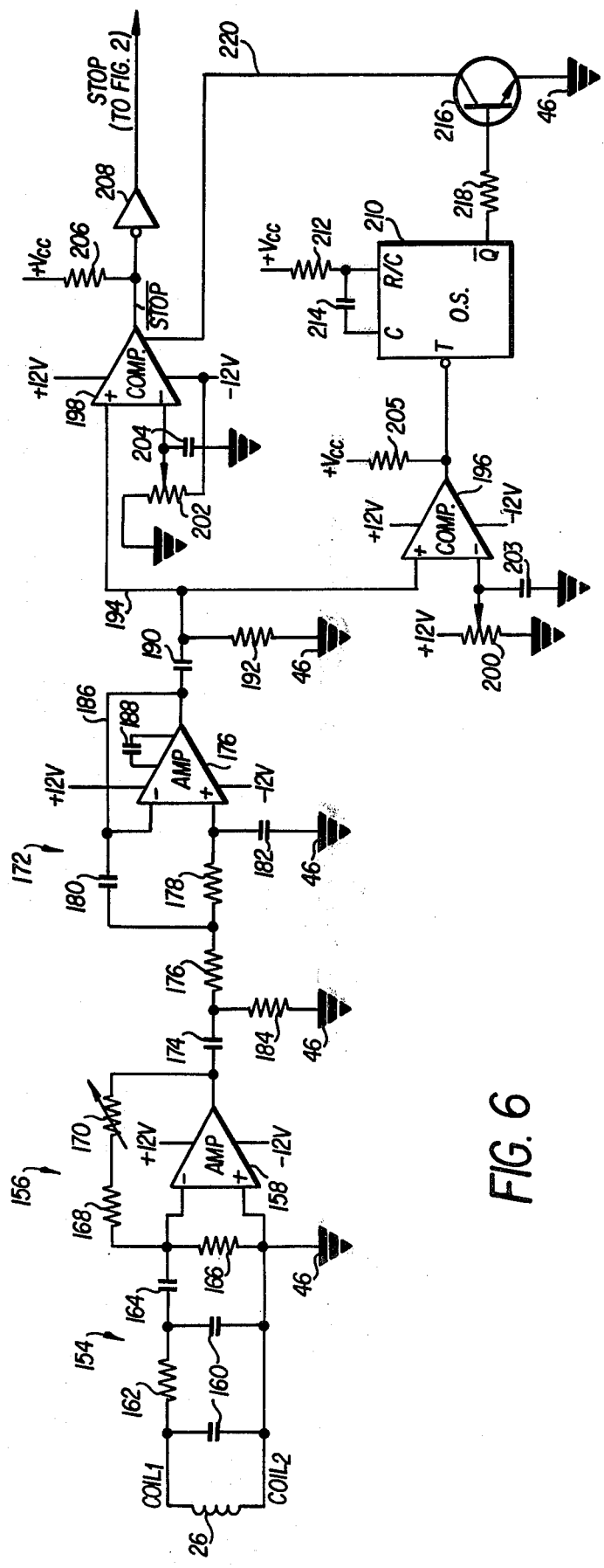
FIG. 6 is a detailed schematic diagram of an actual circuit constructed according to the block diagram of FIG. 5.

FIG. 6 illustrates schematic diagram of actual circuitry suitable for the sensing means 142 of FIG. 5. In FIG. 6, the COIL$_1$ and COIL$_2$ leads of the inductive pickup coil 26 are connected through an input high frequency cut-off filter 154 to a current-to-voltage converter 156 comprising an appropriately connected operational amplifier integrated circuit 158. The input filter 154 has a pi configuration and comprises a pair of shunt capacitors 160 and a series resistor 162. The inverting (−) input of the operational amplifier 158 is supplied from the input filter 154 through a coupling capacitor 164, while the non-inverting (+) operational amplifier input is connected directly to the COIL$_2$ line and to the circuit ground point 46.

Since the current-to-voltage converter 156 must respond to current induced in the pickup coil 26 and not to voltage, it has a fairly low input resistance established by a resistor 166 connected across its input terminals. This allows current flow in the pickup coil 26. The resistor 166 has a relatively low value, for example, 100 Ohms, and there is relatively little series resistance in the circuit. The resistance of the resistor 162 is typically 0.22 Ohms, and the capacitive reactance of the capacitor 164 is not substantial. The signal to noise ratio of the system 10 is thereby enhanced because current sensing results in a greater power transfer than would voltage sensing.

For negative feedback, series resistors 168 and 170 are connected between the operational amplifier 158 output and the inverting (−) input. These resistors establish the current-to-voltage conversion factor. It will be seen that the resistor 170 is variable.

The current-to-voltage converter 156 supplies an active lowpass filter 172 through a coupling capacitor 174. The active lowpass filter 172 comprises an operational amplifier 176 having an input network with series resistors 176 and 178 connected to the non-inverting (+) input, a characteristic-determining capacitor 180 connected between the junction of the input resistors 176 and 178 and the inverting (−) input, a capacitor 182 connected between the non-inverting (+) input and circuit ground 46, and a resistor 184 connected between the junction of the coupling capacitor 174 with the resistor 176 and circuit ground 46.

To complete the active lowpass filter 172, a feedback line 186 is connected between the operational amplifier 176 output and the inverting (−) input, and a compensation capacitor 188 is connected to appropriate terminals on the operational amplifier 176. The characteristic of the particular active lowpass filter 172 is such that it cuts off above approximately 6000 Hz, which is suitable for the TABLE CLOCK frequency of 75 kHz employed in the system described herein.

The output of the active lowpass filter 172 is connected through a coupling capacitor 190 and then to a biasing resistor 192, having its other terminal connected to circuit ground 46. More particularly, the lowpass filter 172 supplies a line 194 on which appears a waveform envelope representative of current induced in the inductive pickup coil 26.

The line 194 carrying the representative waveform is connected to the comparison inputs of first and second comparators 196 and 198. In this particular arrangement, the non-inverting (+) inputs of the comparators 196 and 198 are connected as the signal inputs, and the inverting (−) inputs are connected as the reference inputs. Accordingly, the line 194 is connected directly to the non-inverting (+) inputs, while the inverting (−) inputs are connected to respective adjustable reference voltage dividers 200 and 202 comprising potentiometers. Bypass capacitors 203 and 204 are connected to the comparator reference (−) inputs, and output pull-up resistors 205 and 206 for the comparators 196 and 198 are tied to $+V_{CC}$.

More particularly, the first comparator 196 is responsive to the waveform envelope carried by the line 194 crossing one threshold, for example, crossing 90% of the peak positive voltage in a high to low direction, and the second comparator 198 is responsive to the waveform envelope carried by the line 194 crossing another threshold, for example −2 volts. The second comparator 198 generates a timing signal, and more particularly the $\overline{STOP}$ signal, which indicates that a particular portion of the moving current sheet has crossed the reference point carried by the cursor 24. In the particular embodiment illustrated, it will be seen that the second comparator 196 actually generates a $\overline{STOP}$ signal, and an inverter 208 supplies the STOP line.

The second comparator 198 is enabled only in response to a signal from the first comparator 196. More particularly, the second comparator 198 is enabled for a predetermined interval in response to the first comparator 196. To this end, a monostable multivibrator integrated circuit 210 is configured as a one shot, with an external resistor 212 and compacitor 214 appropriately connected to establish a 100 microsecond output pulse. A low activated trigger (T) input of the one shot 210 is connected to the output of the first comparator 196 such that the one shot 210 is activated when the output of the comparator 196 goes from high to low. An output amplifier comprising an NPN switching transistor 216 connected in common emitter configuration has its base terminal connected through a current limiting resistor 218 to the Q output of the one shot 210. The collector of the transistor 216 is connected through an enable line 220 to an appropriate terminal of the second comparator 198. In operation, the second comparator 198 is enabled to produce an active low $\overline{STOP}$ pulse only when the transistor 216 is biased into conduction effectively connecting the enable line 220 to circuit ground 46.

As previously mentioned, the particular threshold for the first comparator 196 is selected to be approximately 90% of the peak voltage appearing on the reference waveform line 194. Accordingly, the free terminal of the potentiometer 200 is connected to the +12 volt source. The connection of the output of the comparator 196 to a low activated trigger (T) input of the one shot 210 ensures that the one shot 210 is activated on a high-to-low transition of the comparator 196 output.

The particular threshold selected for the second comparator 198 is a negative voltage. Accordingly, the free end of the potentiometer 202 is connected to the −12 volt source.

The operation of the system 10 as thus far described will now be explained with reference to the waveforms of FIGS. 7, 8 and 9. This operational description is primarily in terms of a scan of the X axis and the determination of an X positional coordinate. It will be understood that a scan of the Y axis proceeds in substantially the same manner.

Figure 7:
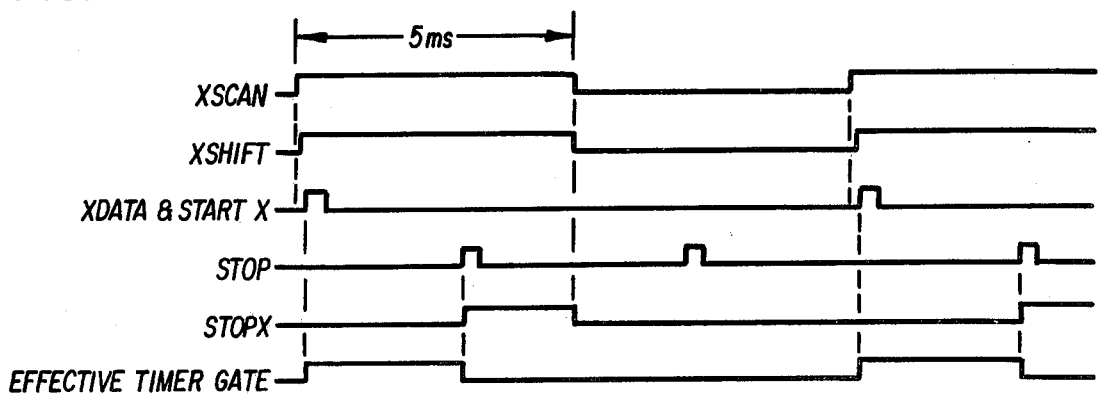
FIGS. 7, 8 and 9 show signal waveforms occurring at various portions of the circuits of FIGS. 2, 3 and 6 during the operation thereof.

In FIG. 7, an overview of the entire operational sequence as established by the FIG. 2 waveform generator 34 is shown. From FIG. 7, it can be seen that X SCAN alternates between high and low over a ten millisecond (ms) period, thus being high for five milliseconds (ms) each time. Although not shown in FIG. 7, it will be appreciated that Y SCAN behaves in a similar but opposite manner. That is, when X SCAN is high, Y SCAN is low, and vice-versa.

Initially X SCAN is low, activating the clear (CLR) input of the flip-flop 74 and holding the Q output thereof and thus XSHIFT low. With XSHIFT low, the preset (PR) input of the flip-flop 76 is activated, holding the Q output thereof and thus STOP X low.

While XSHIFT is low, the SHIFT/LOAD input of the shift register 80 is low, permitting the loading in of data from the parallel data input lines A through H. Thus, the first seven stages of the shift register 80 are low, and the eighth or H stage is high. It will be appreciated that these particular parallel data inputs, as well as the tying of the shift register 80 serial input (SI) to logic high (+$V_{CC}$), are appropriate to establish the particular tablet conductor energization pattern desired, including the trailing edge thereof.

Assuming ENABLE is high, the upper one shot 64 is triggered at the end of the pulse from the one shot 66, so that XSCAN goes high. After XSCAN goes high, XSHIFT goes high on the next succeeding low-to-high transition of TABLE CLOCK. (TABLE CLOCK is not shown in FIG. 7 due to the extremely large time scale whch does not permit résolution of individutal TABLE CLOCK pulses). Thus, there is a slight delay between the leading edge of the XSCAN pulse and the leading edge of the XSHIFT pulse, with the amount of the delay depending upon precisely when the low-to-high transition of XSCAN occurs with reference to TABLE CLOCK. The amount of this delay, as well as of other delays, is exaggerated in FIG. 7 for clarity of illustration.

When XSHIFT goes high, the preset (PR) input of the flip-flop 76 is no longer active, leaving the flip-flop 76 free to follow the D input (tied to logic low) upon the receipt of a CLOCK pulse. However, the flip-flop 76 receives no CLOCK pulses on its CLOCK (CK) input at this time because STOP is low and the Schmitt trigger NAND gate 78 is not activated.

Additionally, when XSHIFT goes high, the data in the shift register 80 immediately begins to clock out. The $\overline{Q}_H$ output goes high so that START X goes high. The $Q_H$ output goes low so that XDATA goes high. (Ignoring any slight delay in the inverter 82, XDATA and START X behave identically). START X going high starts the X TIMER 132, beginning the timing sequence.

When the FIG. 6 sensing circuitry senses passage of the predetermined portion of the current wave past the cursor 24, STOP goes high. This enables the Schmitt trigger NAND gate 78 such that the next CLOCK pulse activates the NAND gate 78, and the flip-flop 76 is then clocked when CLOCK subsequently goes low. Since the flip-flop 76 D input is tied to logic low, the $\overline{Q}$ output thereof and STOP X immediately go high, stopping the X TIMER 132. The count in the X TIMER is then representative of the time between the beginning of the scan sequence when START X goes high and the predetermined portion of the current wave passing the cursor 24, and is thus representative of the X positional coordinate.

The last line in FIG. 7, labeled "Effective Timer Gate," does not represent an actual waveform in the illustrated circuit, but rather is a representation of the time during which the X TIMER 132 is counting. It will of course be appreciated that such a waveform could readily be generated, if desired, for example by employing a Set-Reset flip-flop receiving the START X and STOP X signals.

When X SCAN finally goes low, it immediately clears the flip-flop 74 such that XSHIFT goes low. XSHIFT going low immediately presets the flip-flop 76 such that STOP X goes low.

At this point a scan of the Y axis proceeds in the same manner, and will not be further described except to note that because the X and Y scans share the same cursor 24 and the same detector circuitry of FIG. 6, an intermediate STOP pulse is illustrated. This intermediate STOP pulse is a response to the passage of the particular portion of the Y current sheet past the cursor 24, and thus is an output signal representing the position of the cursor along the Y coordinate axis.

At the right-hand portion of FIG. 7, XSCAN again goes high, beginning the entire process over. It will be appreciated that in the event the ENABLE line from the control logic 128 is low, due to a decision made by the control logic 128, then the NAND gate 72 cannot become activated and no further scan occurs.

Figure 8:
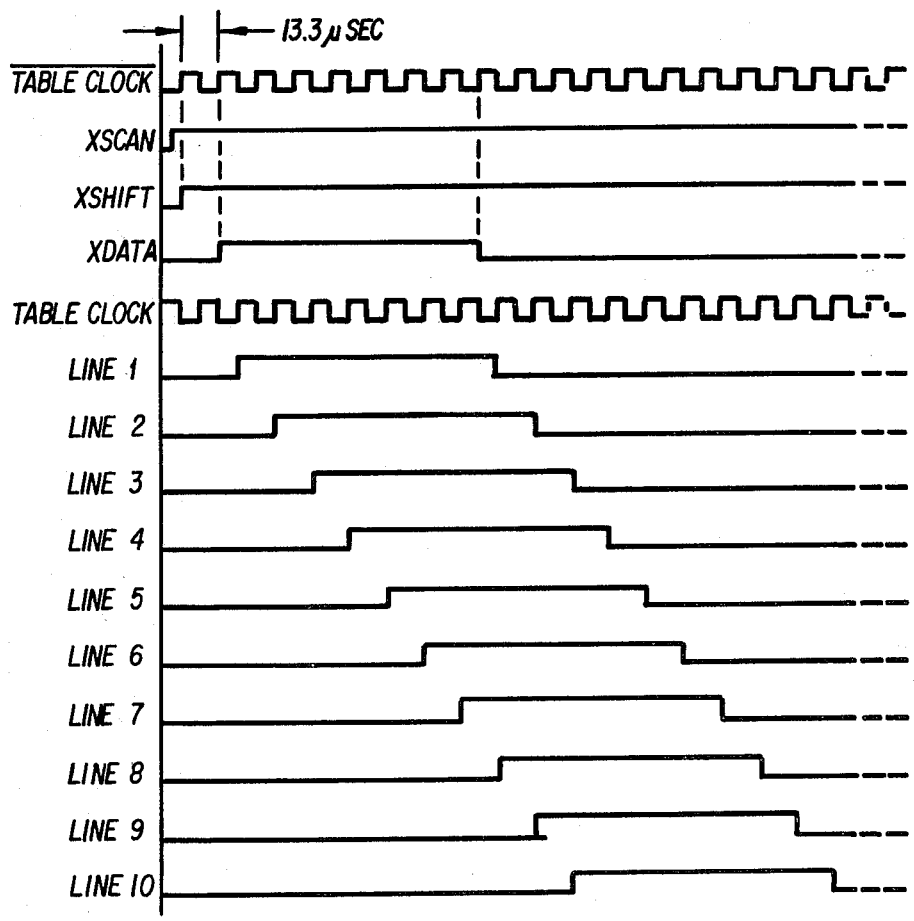

The waveforms of FIG. 8 are on a greatly expanded time scale and illustrate in greater detail the operation of the circuitry of FIGS. 2 and 3 at the beginning of an X axis scan. The scale of the FIG. 8 waveforms is such that the individual $\overline{\text{TABLE CLOCK}}$ and TABLE CLOCK pulses may be seen, although not the much higher frequency CLOCK pulses.

$\overline{\text{TABLE CLOCK}}$ and TABLE CLOCK pulses are continuously generated. The operational sequence begins when XSCAN goes high. As may be seen, on the next low-to-high transition of TABLE CLOCK, XSHIFT goes high. At this point, the shift register 80 is ready to receive clock pulses. Upon the next lot-to-high transition of $\overline{\text{TABLE CLOCK}}$, the shift register 80 shifts one step to the right. Thus, the data originally in stage H (logic high) is discarded, and the data previously in stage G (logic low) moves to stage H. Accordingly, $Q_H$ goes low and, through the inverter 82, XDATA goes high. Although not specifically shown in FIG. 8, it will be appreciated that at the same time, START X goes high. XDATA remains high for seven consecutive TABLE CLOCK pulses as the data (originally logic low) in the first seven shift register stages A through G is clocked out. This data is replaced by logic highs introduced at the serial input (SI) of the shift register 80 because the serial input (SI) is connected to logic high.

The remaining lines of FIG. 8, designated "LINE 1" through "LINE 10," represent the activation of the stages of the extended shift register 96 and thus the energization of the X axis tablet conductors of the first plurality 92. It can be seen that the pattern established by the XDATA line simply shifts along the extended shift register 96. Since TABLE CLOCK is derived from $\overline{\text{TABLE CLOCK}}$, the clocking of the shift register 80 and the extended shift register 96 are synchronized.

From FIG. 8, it will be seen that no more than seven tablet conductors are energized at a time. For example, when LINE 8 goes high energizing the corresponding tablet conductor, LINE 1 goes low, thus preserving the total of seven. Once the pattern is established, it moves uniformly at a constant rate across the tablet 22.

The operation of the current sensing and detector circuitry of FIG. 6 will now be explained with reference to the waveforms of FIG. 9. The first line of FIG. 9 labeled "Coil Current" depicts current in the pickup coil 26 as the current sheet and resulting magnetic field translate down the X axis conductors past the pickup coil 26. As previously stated, the diameter of the pickup coil 26 preferably is approximately equal to the width of the current sheet, and thus spans approximately seven of the tablet conductors. As the effective moving magnetic field approaches the pickup coil 26, current builds up in steps to a maximum. As the current sheet approaches the center of the pickup coil 26, the current induced in the trailing edge of the coil, of opposite polarity, becomes significant. Accordingly, the current induced in trailing edge of the coil 26 bucks the current from the leading edge of the coil 26. This reduces the total current flowing in the coil 26 until the current induced in the leading edge is exactly equal to the current in the trailing edge. At this time, current flow in the coil 26 is zero. As the current sheet passes the center of the coil 26, current induced in the leading edge of the coil is less than current induced in the trailing edge of the coil. The resultant sum coil 26 current increases to a second maximum which is of opposite polarity with respect to the first maximum. As the current sheet moves further along the tablet 22 surface, the sum current again approaches zero.

The current to voltage converter 156 converts this coil current waveform to a corresponding voltage waveform. Filtering, primarily by the active lowpass filter 172, produces the waveform labeled "Filtered Waveform" on the line 194. As is well known, such filters introduce a phase delay which must be taken into account. It can be seen from FIG. 9 that the "Filtered Waveform" accordingly is slightly delayed with respect to the "Coil Current" waveform.

As previously stated, one of the features of the present system is that fairly high signal levels are available. This is primarily a result of the simultaneous energization of a plurality of the conductors and the sensing of coil current, as contrasted to coil voltage. Accordingly, a fairly wide bandwidth, non-critical component lowpass filter may be employed. This minimizes filter ringing and, more importantly, results in a fairly constant and stable phase delay. The particular filter described herein has a phase delay which varies less than fifty nanoseconds with normally encountered temperature variations. The system 10, once initilized, then maintains its calibration.

Figure 9:
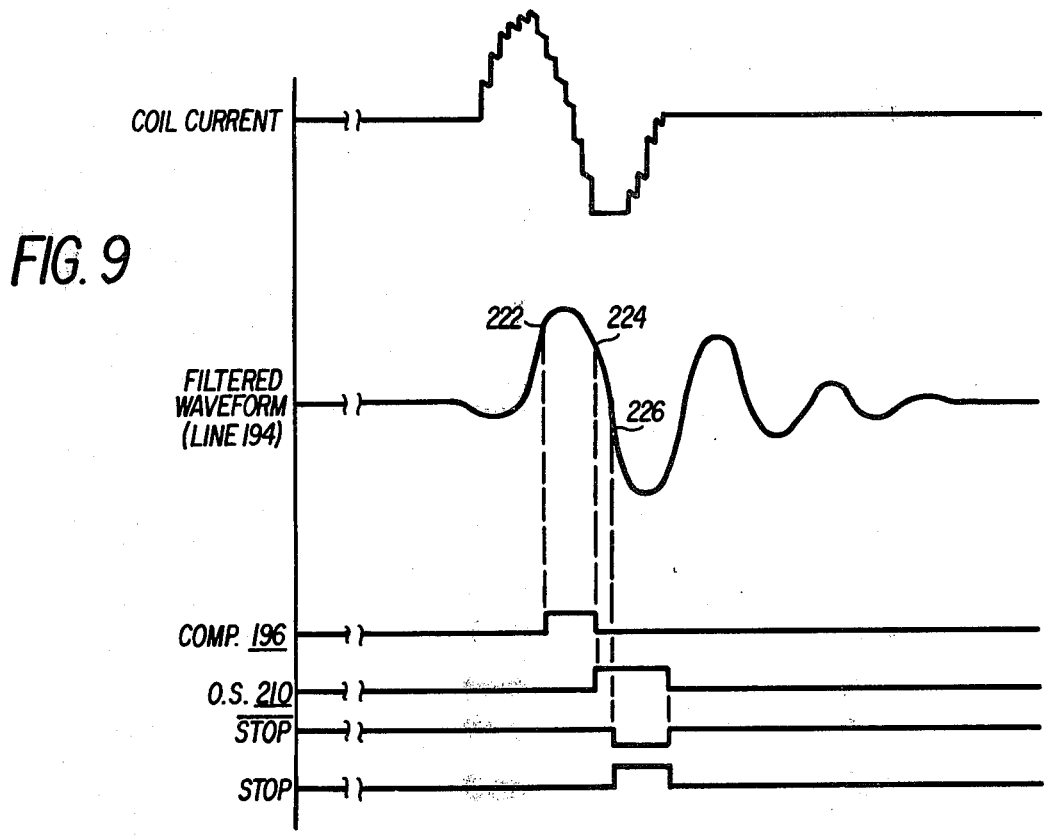

The last four waveforms in FIG. 9, which are digital waveforms, refer respectively to the output of the first comparator (COMP. 196), the one shot (O.S. 210), the $\overline{\text{STOP}}$ output of the second comparator 198, and the STOP output of the inverter 208.

As the filtered waveform voltage passes approximately 90% of its peak voltage, (point 222 on the filtered waveform), the comparator 196 is activated and its output goes high. At point 224 on the filtered waveform, the voltage applied to the non-inverting (+) input of the comparator 196 again falls below the reference voltage, and the comparator 196 output goes low. This high-to-low transition of the comparator 196 output triggers the one shot 210 and its output goes high, enabling the second comparator 198 through the switching transistor 216.

When the filtered waveform voltage reaches point 226, the voltage on the non-inverting (+) input of the second comparator 198 is less than the voltage on the inverting (−) input. Accordingly, $\overline{\text{STOP}}$ goes low, and STOP goes high. This immediately activates the NAND gate 78 of FIG. 2 to produce the STOP X signal, as previously described.

This two comparator system wherein the first comparator enables the second has several important advantages. One advantage is that it permits optimization of the precise triggering threshold of the second comparator at a point on the waveform with a fairly steep slope and hence relative amplitude in sensitivity, without concern that this threshold is placed at a point which would otherwise lead to susceptibility to false triggering. For example, the particular threshold which has been found to be advantageous from the standpoint of minimizing amplitude sensitivity (−2 volts) would otherwise be a particularly poor choice from the standpoint of minimizing noise response because it is not far removed from the zero voltage quiescent signal state.

Moreover, regardless of the precise selection of the triggering threshold of the second comparator 198 for amplitude insensitivity, it will be apparent that the mere requirement that two comparators be activated in a particular sequence itself produces additional noise immunity. The particular interval during which the second comparator 198 is enabled determined by the output pulse width of the one shot 210 accordingly is selected to allow response to the waveform crossing the second threshold when the portion of the current sheet actually crosses the reference point carried by the cursor, and at the same time to minimize the possibility of response to the waveform crossing the second threshold due to an extraneous noise signal.

A modification of the system described above will now be described with particular reference to FIGS. 10 and 11. In the first embodiment described above, the first seven parallel data inputs of the parallel-in/serial-out shift registers 80 and 88 (FIG. 2) are all connected to logic low such that the fixed energization pattern comprises all of the lesser plurality of tablet conductors being energized. Thus, a single current cycle was induced in the pickup coil 26 as the current sheet passed, as was shown in FIG. 9. A particular advantage of the subject system is that other energization patterns may easily be selected by appropriate parallel data entry into the shift registers 80 and 88. In such case, a more complex pickup coil current waveform results. A correlation detector may be employed, rather than the fairly simple detector described above with reference to FIG. 6. Such a correlation detector system could be employed where noise immunity is a particular problem. It will be appreciated that it is much more unlikely that a particular complex waveform would be precisely duplicated by noise.

Figure 10:
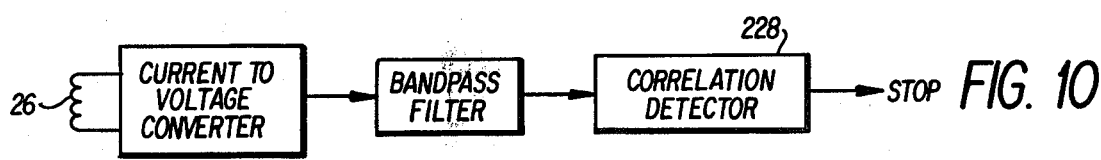
FIG. 10 is a block diagram, similar to FIG. 5, but of a modified embodiment.

This general approach is depicted in FIG. 10 wherein the simple detector 152 of FIG. 5 is replaced by a correlation detector 228 which responds to a particular complex waveform to produce the STOP signal.

Figure 11:
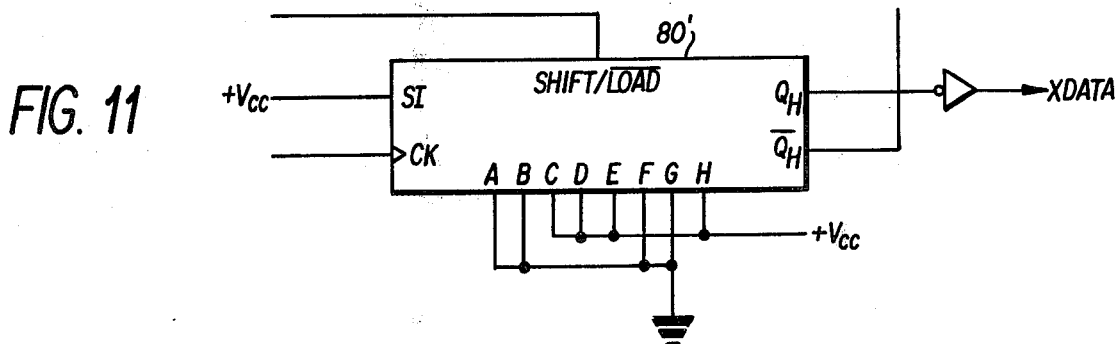
FIG. 11 is an electrical schematic diagram of one of the parallel-in/serial-out shift registers of FIG. 2 suitably modified for use in the system of FIG. 7.

Considering a specific implementation of this modified approach, in FIG. 11 there is generally illustrated a small portion of the waveform generator 34 of FIG. 2, and more particularly a modified shift register portion thereof, designated 80'. It will be appreciated that the Y axis shift register 88 of FIG. 2 would be similarly modified. The particular modification is that the parallel data inputs C, D and E are tied to logic high such that the XDATA output in FIG. 11 comprises two consecutive logic high pulses for clocking into the extended shift register 96 of FIG. 3 to produce a double humped energization pattern moving down the X axis.

Figure 12:
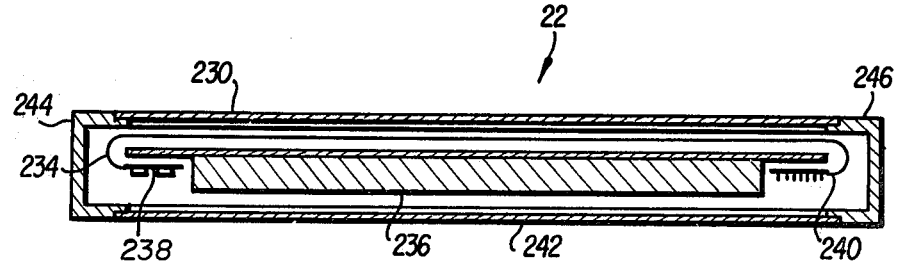
FIG. 12 is a side elevational view in cross section of one form of tablet showing constructional details thereof.

FIG. 12 illustrates mechanical details of construction of the tablet 22. In FIG. 12, the upper surface of the tablet 22 comprises a sheet 230 of a rigid, durable, electrically non-conductive material, which preferably is a high pressure laminated plastic layer of malamine and phenolic impregnated materials, manufactured by the Formica Company of Cincinnati, Ohio under the trademark "FORMICA". Below the sheet 230 is a continuous substrate 232 for the tablet conductors which are represented in FIG. 12 by a single conductor 234. The substrate 232 either may be an insulating non-magnetic substance such as glass, or may be a ferromagnetic material such as steel. In either case, the conductors represented by the conductor 234 comprise thirty gauge insulated wires bonded to the surface of the substrate 232 on 0.2 inch centers. Both of the preferred substrate materials have the advantage of relative dimensional stability compared to other substrates which previously have been used for this purpose, such as phenolic printed circuit board material.

A particular advantage of glass when employed for the substrate 232 material is that it transmits light, permitting back lighting of the tablet 22 surface which is useful in some situations. While steel does not have this advantage, it has the advantage of concentrating the moving magnetic field, resulting in a greater current in the pickup coil 26 for a given tablet conductor current. As a practical matter, a lower current for the tablet conductors is selected when steel is used for the substrate 232, and the coil 26 current remains unchanged. Particular examples, already noted above, are ninety milliamperes for a glass substrate, and thirty millimperes for a steel substrate 232.

The substrate 232 is supported by a rigid honeycomb type structure 236 which is appropriately selected to provide high strength rigidity and yet be relatively light in weight.

The representative conductor 234 is connected to the edges of printed circuit boards 238 and 240 which respectively carry circuitry associated with the elongated shift registers 96 and 110 of FIG. 3, and the constant current conductors 98. The circuit board 238 may be seen to be carrying a pair of integrated circuit packages, representing one of the shift register integrated circuit packages 102, 104, 106 and a package including eight of the buffer amplifiers 108.

Lastly, the FIG. 12 table includes a protective lower sheet 242, and end caps 244 and 246.

Figure 13:
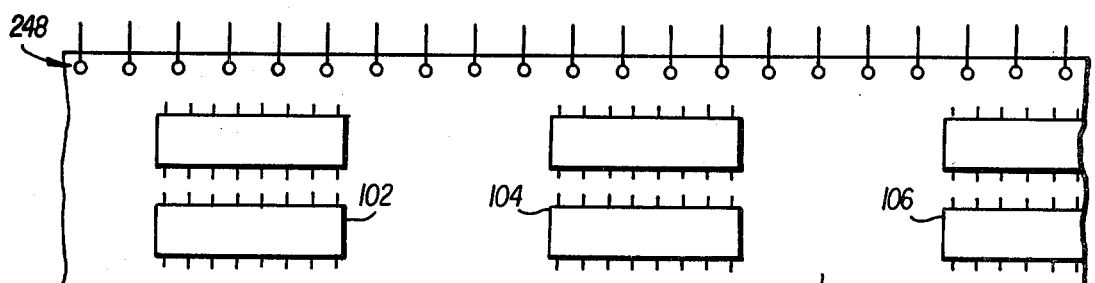
FIG. 13 is a view of one of the shift registers and current switch circuit boards physically associated with the tablet.

FIG. 13 is a greatly enlarged view of a section of the representative printed circuit board 238. Conventionally mounted on the board 238 are a plurality of sixteen-pin dual inline integrated circuit packages comprising the shift register 96 and the buffer amplifiers 108. The tablet conductors are terminated at suitable connectors 248, which may simply be solder connections, along the edge of the printed circuit board 238. This particular mechanical configuration easily accommodates the 0.2 inch wire spacing, and provides convenient mounting of the shift registers and output buffers.

By way of example only and not by way of limitation, suitable component values for the circuitry described herein will now be provided. In FIG. 2, the Schmitt trigger low activated OR gate 50, and the two Schmitt trigger NAND gates 58 and 78 comprise standard TTL gates, such as those included in a Texas Instruments Type No. SN74LS132 integrated circuit package. The inverters 62, 82 and 90 may comprise type number SN7428 TTL NOR gates, with one input connected to logic low.

The four D-type flip-flops 74, 76, 84 and 86 may comprise type No. SN74LS74 TTL flip-flops. The shift registers 80 and 84 may comprise type No. SN74LS165 TTL integrated circuits. The monostable multivibrator one shots 64 and 66 of FIG. 2, as well as the one shot 210 of FIG. 6, may comprise Signetics Type No. 26SO2.

In FIG. 3, the serial-in/parallel-out shift registers 102, 104, 106, 112, 114 and 116 may comprise Type No. SN74164 TTL integrated circuits, and the buffer amplifiers 108 and 118 may comprise Sprague Type No. ULN2003 integrated circuits.

In FIG. 4, the voltage regulator 120 may comprise a Texas Instruments Type No. 28LO5.

In FIG. 6, the operational amplifiers 158 and 176 may comprise National Type No. 5534, and the comparators 196 and 198 may comprise Type No. 311. For the NPN switching transistor 216, Type No. 2N3704 is suitable. The inverter 208 may comprise a Type No. SN74LS00 TTL NAND gate, with both inputs tied together.

The following TABLE provides values for the components other than the active devices described above.

TABLE

| Resistors | |
|---|---|
| 54 | 330 Ohm |
| 68 | 18 K Ohm |
| 162 | 0.22 Ohm |
| 166 | 100 Ohm |
| 168 | 150 K Ohm |
| 170 | 150 K Ohm variable |
| 176, 178 | 15 K Ohm |
| 184 | 1.5 K Ohm |
| 192 | 5.6 K Ohm |
| 200, 202 | 20 K Ohm potentiometer |
| 205, 206 | 407 Ohm |
| 218 | 1 K Ohm |

| Capacitors | |
|---|---|
| 56, 188 | 82 pf. |
| 70 | 1 mfd. |
| 160, 174, 190, 204 | 0.1 mfd. |
| 164 | 0.01 mfd. |
| 180, 203, 214 | 0.01 mfd. |

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A system for locating the position of a cursor along a coordinate axis, said system comprising:
   a plurality of parallel conductors spaced along the axis and defining a locus;
   means for sequentially energizing said conductors in simultaneously energized lesser pluralities with a fixed energization pattern which steps along said plurality of conductors, thereby generating a current sheet which translates along the locus of and parallel to said conductors;
   means for sensing the passage of a particular portion of the current sheet across a reference point carried by the cursor; and
   means responsive to the time of passage of the particular portion of the current sheet for generating an output signal representing the position of the cursor along the coordinate axis.

2. A system according to claim 1, wherein said conductors are uniformly spaced and wherein the energization pattern steps along at a uniform rate.

3. A system according to claim 2, which further comprises means for energizing said conductors with constant currents.

4. A system according to claim 1, wherein the fixed energization pattern comprises all of said lesser plurality of conductors being energized.

5. A system according to claim 4, which further comprises means for energizing said conductors with constant currents.

6. A system according to claim 4, wherein said lesser plurality comprises seven conductors.

7. A system according to claim 1, wherein said cursor carries an inductive pickup coil.

8. A system according to claim 7, wherein the diameter of said inductive pickup coil is approximately equal to the width of the current sheet along its direction of translation.

9. A system according to claim 8, wherein said means for sensing the passage of a particular portion of the current sheet includes means for sensing current induced in said inductive pickup coil.

10. A system according to claim 7, wherein said means for sensing the passage of a particular portion of the current sheet includes means for sensing current induced in said inductive pickup coil.

11. A system according to claim 10, which further comprises means for energizing said conductors with constant currents.

12. A system according to claim 10, wherein said current sensing means comprises a current-to-voltage converter.

13. A system according to claim 10, wherein said means for sensing the passage of a particular portion of the current sheet comprises a low pass frequency filter for generating a waveform envelope representative of current induced in said inductive pickup coil.

14. A system according to claim 13, wherein said means for sensing the passage of a particular portion of the current sheet further comprises:
a first comparator responsive to the waveform envelope crossing a threshold;
a second comparator responsive to the waveform envelope crossing another threshold for generating a timing signal; and
means for enabling said second comparator only in response to said first comparator.

15. A system according to claim 14, wherein said second comparator is enabled for a predetermined interval selected to allow response to the waveform crossing the other threshold when the portion of the current sheet actually crosses the reference point and selected to minimize the possibility of response to the waveform crossing the other threshold due to an extraneous noise signal.

16. A system according to claim 1, which further comprises means for energizing said conductors with constant currents.

17. A system according to claim 1, wherein said conductors comprise insulated wires bonded to a ferromagnetic substrate.

18. A system according to claim 1, wherein said conductors comprise wires bonded to a glass substrate.

19. A system according to claim 1, wherein said means for sequentially energizing said conductors in simultaneously energized lesser pluralities comprises:
a serial-in/parrallel-out shift register having outputs connected to energize corresponding ones of said conductors;
means for clocking said serial-in/parallel-out shift register; and
means synchronized with said clocking means for serially entering data into said serial-in/parallel-out shift register in accordance with the fixed energization pattern.

20. A system according to claim 19, wherein said means for serially entering data comprises a parallel-in/serial-out shift register having its parallel data inputs connected to fixed logic levels in accordance with the fixed energization pattern and having its serial input connected to a fixed logic level appropriate to establish the trailing edge of the current sheet.

21. A system for locating the position of a cursor on a surface, said system comprising:
a conductor grid including a first plurality of parallel conductors spaced along a first axis in a plane parallel to the surface, and including a second plurality of parallel conductors spaced along a second axis perpendicular to said first axis, also in a plane parallel to the surface, such that the conductors of said second plurality are perpendicular to the conductors of said first plurality;
means for sequentially energizing the conductors in simultaneously energized lesser pluralities with a fixed energization pattern which steps first along said first plurality of conductors and then along said second plurality of conductors, thereby generating a first current sheet which translates along the plane of and parallel to the conductors of the first plurality followed by a second current sheet which translates along the plane of and parallel to the conductors of the second plurality;
means for sensing the passage of a particular portion of each of the current sheets across a reference point carried by the cursor;
means responsive to the times of passage of the particular portions of the current sheets for generating an output signal representing the coordinate position of the cursor on the surface.

22. A system according to claim 21, which further comprises means for energizing said conductors with constant currents.

23. A system according to claim 21, wherein said cursor carries an inductive pickup coil.

24. A system according to claim 23, wherein said means for sensing the passage of the particular portions of the current sheets includes means for sensing current induced in said inductive pickup coil.

25. A system according to claim 24, wherein said current sensing means comprises a current to voltage converter.

26. A system according to claim 23, wherein the diameter of said inductive pickup coil is approximately equal to the widths of the generated current sheets.

27. A system according to claim 26, wherein said means for sensing the passage of the particular portions of the current sheets includes means for sensing current induced in said inductive pickup coil.

28. A system according to claim 26, which further comprises means for energizing said conductors with constant currents.

29. A sensing arrangement for use in a system for locating the position of a cursor along a coordinate axis of the type which sequentially energizes a plurality of parallel conductors spaced along the axis to produce a current wave which translates along the axis, and which responds to the time of passage of the current wave across the cursor to generate an output signal representing the position of the cursor along the coordinate axis, said sensing arrangement comprising:
an inductive pickup coil carried by the cursor; and
means for sensing current induced in said inductive pickup coil.

30. A system according to claim 29, wherein said current sensing means comprises a current-to-voltage converter.

31. In a system for locating the position of a cursor along a coordinate axis of the general type which sequentially energizes a plurality of parallel conductors spaced along the axis to produce a current wave which translates along the axis, and which includes means responsive to the time of passage of the current wave across the cursor to generate an output signal representing the position of the cursor along the coordinate axis, means for sensing the time of passage of a particular portion of the current sheet across a reference point carried by the cursor, which means for sensing comprises:

an inductive pickup coil carried by the cursor;

means responsive to a signal induced in said pickup coil as the current wave passes for generating a waveform envelope;

a first comparator responsive to the waveform envelope crossing a threshold;

a second comparator responsive to the waveform envelope crossing another threshold for generating a timing signal; and means for enabling said second comparator only in response to said first comparator.

32. A system according to claim 31, wherein said second comparator is enabled for a predetermined interval selected to allow response to the waveform crossing the other threshold when the portion of the current sheet actually crosses the reference point and selected to minimize the possibility of response to the waveform crossing the other threshold due to an extraneous noise signal.

* * * * *